May 8, 1956 P. M. G. TOULON 2,744,949

TELEVISION SYSTEMS

Filed June 18, 1951 3 Sheets-Sheet 1

INVENTOR
P. M. G. TOULON
BY Moore and Hall
ATTORNEYS

INVENTOR
P. M. G. TOULON
BY Moore and Hall
ATTORNEYS

May 8, 1956 | P. M. G. TOULON | 2,744,949

TELEVISION SYSTEMS

Filed June 18, 1951 | 3 Sheets-Sheet 3

INVENTOR
P. M. G. TOULON

BY Moore and Hall
ATTORNEYS 2,744,949
Patented May 8, 1956

2,744,949

TELEVISION SYSTEMS

Pierre Marie Gabriel Toulon, Paris, France, assignor, by direct and mesne assignments, of seventy-five per cent to Products and Licensing Corporation, New York, N. Y., a corporation of Delaware, and twenty-five per cent to Nelson Moore and William D. Hall, as joint tenants Application June 18, 1951, Serial No. 232,075

12 Claims. (Cl. 178—5.2)

The invention relates to television systems, and has several objects including (1) to produce an improved television receiver and (2) to produce a "compatible" television receiver that avoids the complexity of special color tubes.

It is well known that there are two principal processes of color television: The first type is "field" frequency (known as C. B. S. system). This system involves sending one after another the totality of dots of one frame corresponding to a first monochrome (namely green), and thereafter the totality of the dots of the second monochrome frame (namely red), and thereafter the totality of dots of a third monochrome frame (namely blue). Thence the cycle begins again. The drawback of this method is that the width of band or radio wave used must be three times higher than for the same "black and white" picture. Since the width of band is limited (because only a few channels are assigned to any one town), the color television according to this process must have a lesser number of lines less dots in every line, and a smaller number of fields scanned per second. The result from the point of view of the accuracy of the picture and flicker is that the color picture has lower quality than "white and black" pictures. The C. B. S. system has the advantage that a conventional "white and black" cathode tube receiver, may be used by adding a rotating color wheel.

The second system involves sending almost simultaneously the three currents corresponding to the three monochromes values of one dot of the picture (namely the "green" value, the "red" value, and the "blue" value): An embodiment of this process is used in the high mixed dot interlaced scanning of Radio Corporation of America. It is also possible to use a lower portion of the spectrum to send the white and black; and the higher portion, at 90° angle phase shift, to send the information concerning the color.

A great advantage of the R. C. A. system in comparison with the first named (or C. B. S.) system is to reduce the width of band used for the same quality of picture and its color signals can be received in "black and white" on conventional receivers, in other words the system is "compatible."

The R. C. A. system has a very great disadvantage in that to receive the picture, it is necessary to have a special three gun tube, with a mosaic of colored phosphor inside of the tube and this special tube is very expensive, and is very difficult to manufacture.

The present invention gives the advantages of both the C. B. S. and R. C. A. systems simultaneously, without the disadvantages of either.

According to the invention, after the radio waves are received, amplified and selected, the first step is to obtain three independant electric channels corresponding to the three video monochromes (yellow, blue and red). The invention utilizes these three channels in conjunction with a conventional "white and black" cathodic tube. A color wheel (or vibrating screen) may be used when color television is to be received.

Throughout this specification, wherever I refer to a color wheel I am doing it only for purposes of simplicity because I have invented several improved substitutes for the conventional color wheel. These substitutes are fully set forth in my copending applications, S. N. 162,327, filed May 5, 1950; S. N. 199,835, filed December 8, 1950; S. N. 188,552, filed October 5, 1950.

Some of the aspects of this invention involve transmitting from the sending station a series of excerpts of information. Each excerpt, herein called a dot, comprises three elements of information one of which elements is representative of the green component of the dot, one of which is representative of the blue component of the dot, and the other of which is representative of the red component of the dot. Each dot naturally represents a predetermined position on the screen. The color wheel has three times as many color sections as in the C. B. S. system and hence three color sections pass the screen each time that a complete frame is scanned. When the green section of the wheel is passing the position of a particular dot, the "green" component of the dot is impressed on the screen. It is, however, not so simple to impress the other two components of the dot on the screen at the proper time. The "blue" component of the dot is delayed in time by one-third of a frame so that it is not impressed on the screen until the color wheel has rotated the "blue" section of the wheel in front of the predetermined position of the dot. In this connection it should be mentioned that during the delay of one-third of a frame the scanning would have normally moved the position of the beam vertically one-third the way down the screen, but this normal scanning must be modified to make the present invention workable. The scanning is therefore modified to switch the beam back one-third of a frame while the "blue" component of the dot is being impressed on the screen. The "red" component of the dot of the video signal is delayed in time by two-thirds of a frame so that this component is not impressed on the screen until the red section of the color wheel arrives in front of said predetermined position. The scanning is this time modified to switch the beam backward by two-thirds of a frame.

Hence, while each dot is made up of three components, these components are separated and fed to the screen at intervals of one-third of a frame apart, and respectively at times when the corresponding colors of the color wheel are in front of the predetermined dot position. The scanning is modified so that each component of information appears at the proper place on the screen.

This application is a continuation-in-part of my prior copending application S. N. 163,285, filed May 20, 1950, entitled Color Television.

Figure 1:
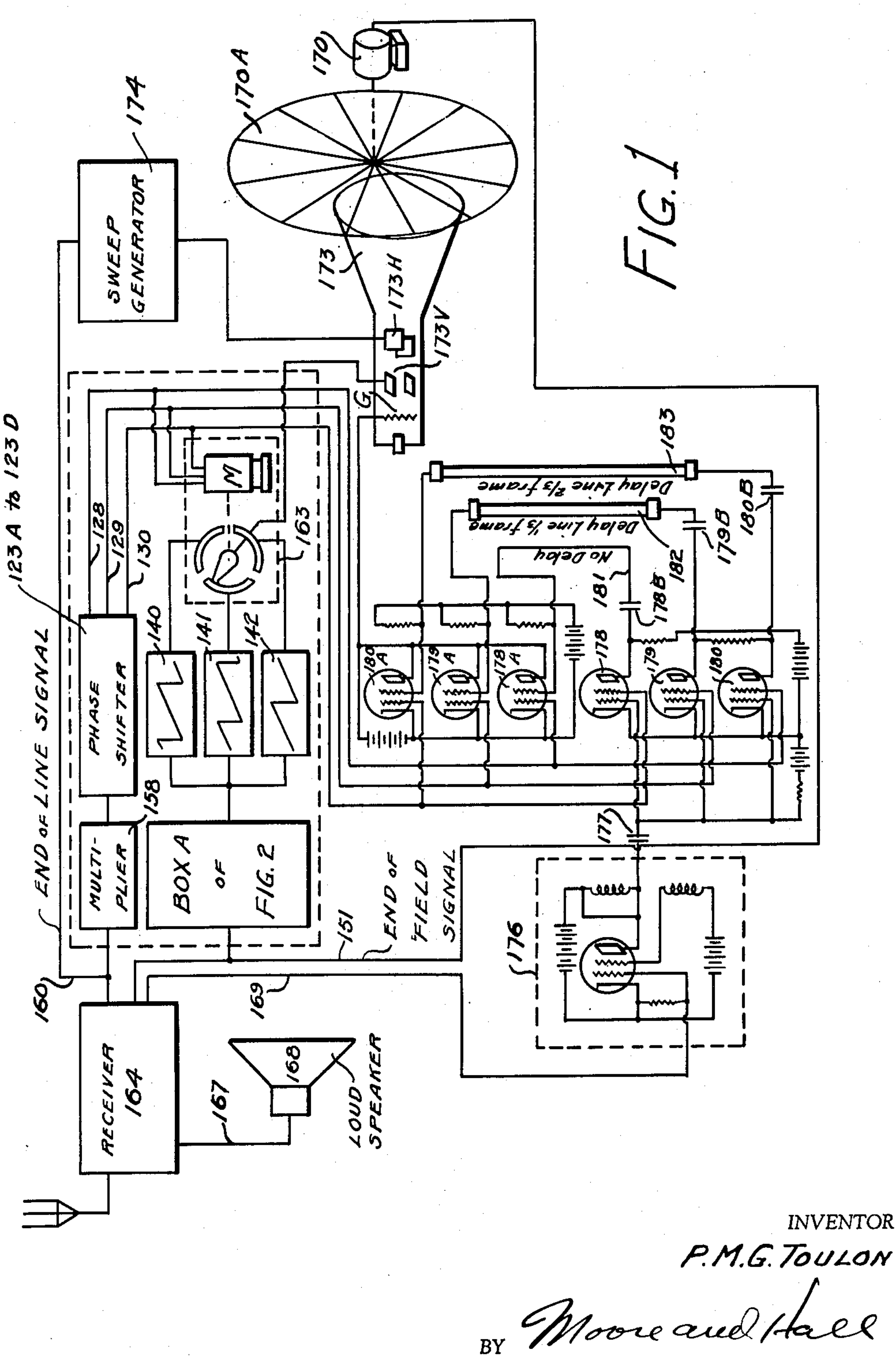
Figure 1 is a schematic drawing of the receiver embodying the invention.

In Figure 1, the conventional video receiver 164 has four output circuits as follows:

(1) loud speaker 168, (2) end-of-line signal channel 160, (3) end-of-field signal channel 151, and (4) video signal channel 169. Referring to end-of-line channel 160, it energizes two circuits as follows, first the relaxation oscillator 174 which is a conventional sweep generator for moving the beam horizontally in the conventional way; and secondly channel 160 energizes frequency multiplier 158 (see Fig. 2) which multiplies the frequency of the end of line signal by the number of dots in a line, whereby the output of multiplier 158 is equal to the dot repetition rate. This output synchronizes oscillator 123 which oscillator employs an oscillator tube 122. The output of oscillator 122 is therefore a sine wave of frequency equal to the dot repetition rate. Connected to the output of oscillator 123 is a phase splitter comprising inductor 123A, capacitor 123B, and resistors 123C and 123D. Therefore the output of the phase splitter comprises three phase currents flowing in wires 125, 126 and 127. The current in wire 126 lags that in wire 125 by 120 degrees and the current in wire 127 lags that in wire 125 by 240 degrees. The current in wire 125 is rectified by rectifier 125A. As the voltage at the output of rectifier 125A rises, the voltage in wire 128 rises until it equals the potential of battery 125D at which time any further rise in voltage is shunted via resistor 125B, rectifier 125C, battery 125D to ground. Hence, the output of channel 128 is a series of square topped pulses. Channel 126 includes rectifier 125A, resistor 126B, rectifier 126C and battery 126D which are complements of equivalent parts in circuit 125. Circuit 127 has parts complementary to those in circuit 125. The result of these three circuits is to produce three square top pulses (for each dot) that do not overlap so far as time displacement is concerned. The repetition rate in each of these three circuits is the same as the dot repetition rate.

I will now point out the functions of end-of-field signal channel 160 (also known as end-of-frame signal channel). This channel serves two functions (*a*) to control the speed of motor 170 which in turn drives color wheel 170A; the color wheel having a series of colored segments for example of green, blue, and red (there may be many segments such as twelve if the series contains four groups each of which is green, blue and red, etc.) and rotates at a speed such that a new segment passes any predetermined point every one-third of a frame, and (*b*) to control the vertical scanning through the medium of the circuit illustrated in the lower half of Figure 4.

Figure 2:
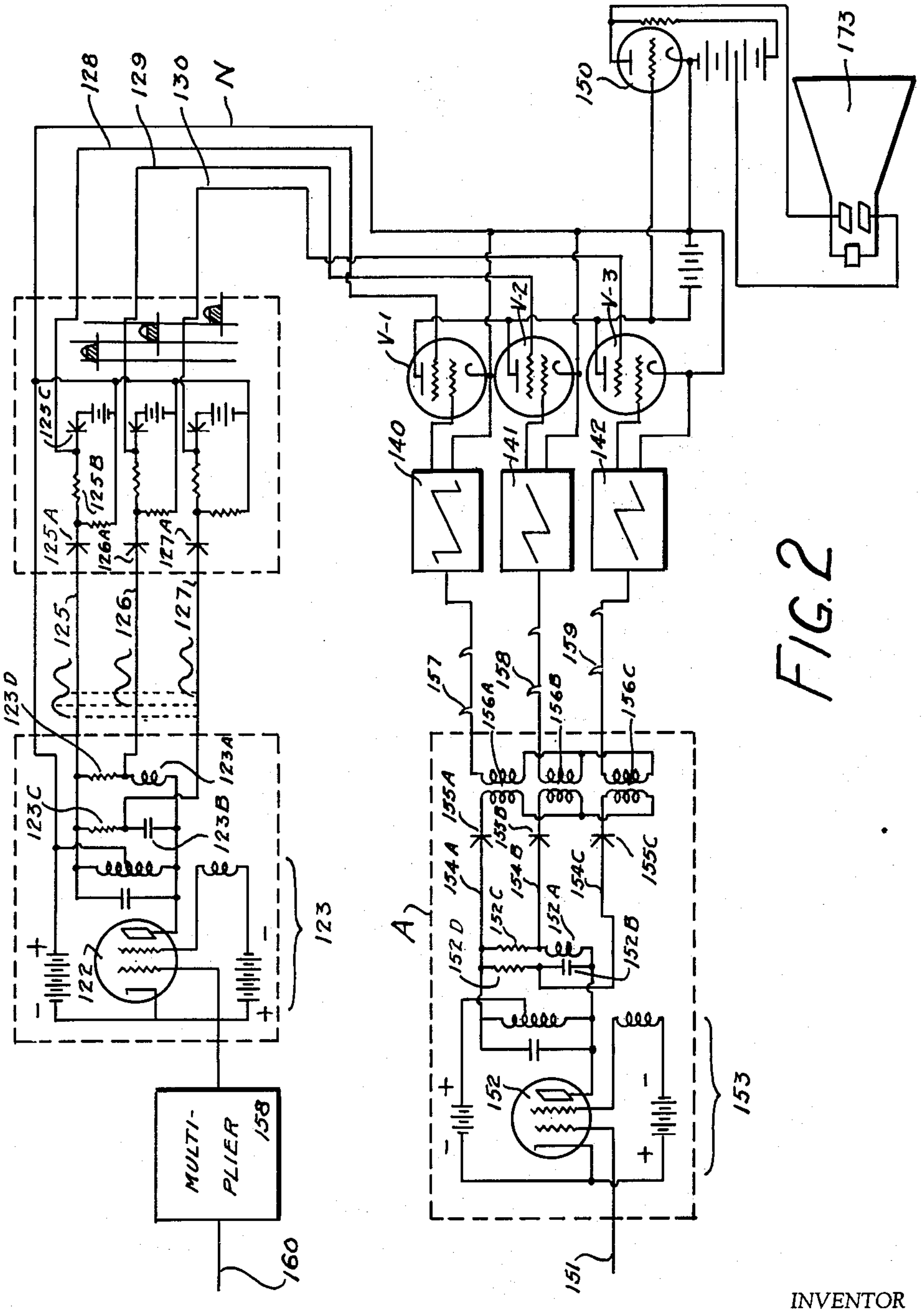
Figure 2 is a schematic diagram of certain component circuits of Figure 1.

In Figure 2, end-of-frame signals feed oscillator circuit 153 (which includes oscillator tube 152). This oscillator operates at a frequency synchronized with the frequency of end of frame signals. The sine wave of oscillator 153 is passed to a phase splitter comprising: inductor 152A, capacitor 152B, and resistors 152C and 152D. The phase splitter has three phase output in wires 154A, 154B and 154C. This output is rectified by rectifiers 155A, 155B and 155C and is fed into transformers 156A, 156B and 156C. These transformers change the variations on their primaries into sharp impulses 157, 158, and 159 on the secondaries, these impulses being displaced in phase as follows: impulse 158 lags 157 by 120 degrees and impulse 159 lags impulse 157 by 240 degrees. The impulses may, if desired, be rectified so that only positive (or in the alternative negative) impulses remain; and the impulses are then fed into saw-tooth sweep generators 140, 141 and 142 of conventional design. Each one of these sweep generators includes means responsive to the impulse fed thereinto for effecting a saw-tooth output voltage synchronized with the input impulses. The result is that the wave forms of all three sweep generators 140, 141 and 142 are identical in amplitude, duration and frequency but are displaced in phase from each other; the output of 141 lagging that of 140 by 120 degrees and the output of 142 lagging that of 140 by 240 degrees.

There is a cooperation between the outputs 128, 129 and 130, and the outputs of sweep generators 140, 141 and 142 now about to be described. This cooperation is illustrated broadly in Figure 1, and the specific means effecting the cooperation is shown in Figure 2. In Figure 1 the three wires 128, 129 and 130 energize three phase motor M which makes one full revolution for each dot. In other words, the motor rotates once for each cycle of oscillator 123. Hence, during the first one-third of the time duration of a dot, the commutator 163 (driven by motor M) connects generator 140 to the vertical deflection plates 173V. During the next one-third of the time duration of a dot, commutator 163 connects generator 141 to the vertical deflection plates 173V, and during the final third of the dot the commutator 163 connects the generator 142 to the vertical deflection plates 173V.

As stated above, I have described the motor M and commutator 163 for purposes of explanation only because it is desirable in practice to employ electrical means to perform the functions of motor M and commutator 163. The electrical means appears in detail in Figure 2, where three tubes V–1, V–2 and V–3 respectively have their controlled grids by the outputs of generators 140, 141 and 152. However, these tubes will not pass current unless their second grids are energized by a pulse. Therefore, when a pulse exists in line 128, generator 140 is connected to amplifier 150 which energizes the vertical deflection plate. When a pulse exists in line 129, generator 141 is connected to amplifier 150, and when a pulse exists in line 130, generator 142 is connected to amplifier 150.

Figure 3:
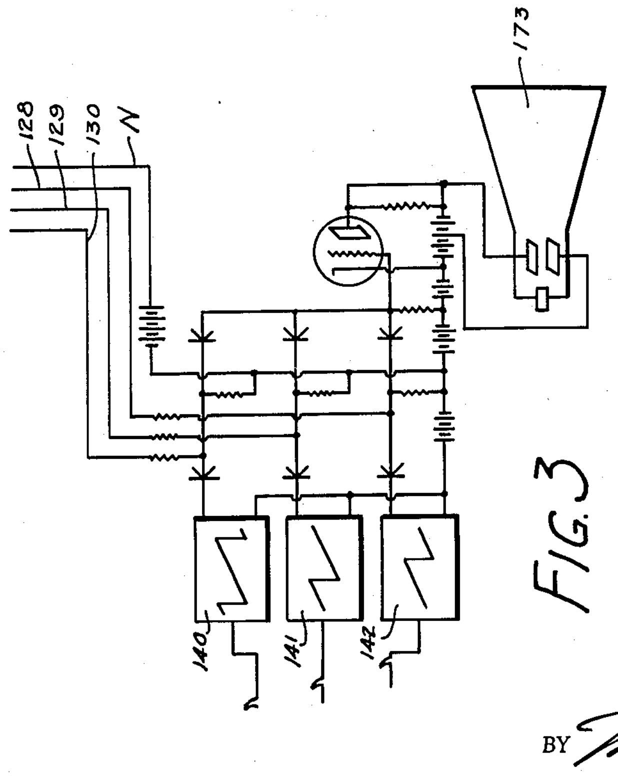
Figure 3 illustrates a modified form of a certain detail of the invention.

Figure 3 illustrates an alternate for the tubes V–1, V–2 and V–3 in which rectifiers 137, 138 and 139 are free to pass current to the amplifier 150 only when a pulse exists in the complementary line 128, 129 or 130 so as to overcome the bias placed against the right hand side of said rectifiers. This arrangement for switching from one sweep generator to another is fully disclosed in several of my prior copending applications including S. N. 149,062, filed March 11, 1950, and S. N. 166,013, filed June 3, 1950.

Referring now to the video channel 169, it may be said that it modulates the carrier wave of high frequency oscillator 176. The purpose of the oscillator 176 is that certain of the signals must pass through delay lines hereinafter described and it is easier to effect the desired delay if the video signal is in the form of a modulation on a high frequency wave than if the video signal is used alone.

The modulated output of oscillator 176 is fed into a control circuit utilizing tubes 178, 179 and 180. In particular the output of coupling condenser 177 is applied in parallel to the control grids of tubes 178, 179 and 180. The second grids of these tubes are respectively energized by wires 128, 129 and 130. These tubes become conductive only when the second grids are energized by a pulse. There is another set of three tubes 178A, 179A, and 180A whose control grids are respectively energized by the anodes of tubes 178, 179 and 180. In the circuit between the anode of tube 178 and the control grid of tube 178A there is a small storage condenser 178B and there is a direct line 181 marked "No Delay." Between the anode of tube 179 and the grid of tube 179A is located small storage condenser 179B and a delay line 182 which delays any signals passing therethrough by a time interval equal to one-third of one frame. Between the anode of tube 180 and grid of tube 180A there is inserted a small storage condenser 180B and a delay line 183 which delays any signals passing therethrough by a time interval equal to two-thirds of one frame. The anodes of tubes 178A, 179A and 180A are in parallel and feed grid G of cathode ray tube 173. The second grids of these tubes are controlled by the potentials on wires 128, 129 and 130 respectively, for reasons which will become apparent later.

Figure 4:
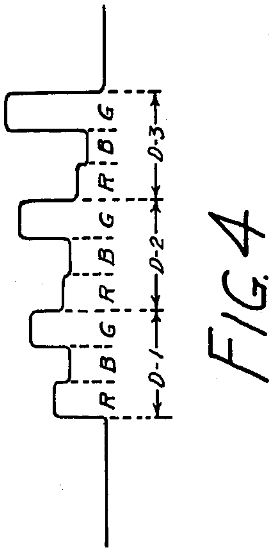
Figure 4 is a waveform of the video modulation received.

In Figure 4, there is shown a radio frequency signal varied according to the video modulation. The excerpt D–1 represents one dot, while excerpt D–2 represents the second dot, while excerpt D–3 represents the third dot. These are the first three dots of the first horizontal line of Figure 5. Each dot has three components, G, B, and R respectively representing the primary colors. This modulation appears on the wave fed through coupling condenser 177 and the "red" excerpt R of dot D–1 is impressed upon the control grid of tubes 178, 179 and 180 but only the latter can pass current at this moment because it is the only one whose second grid is energized. The second grid of tube 180 is energized by the first pulse on wire 128 and at this moment there is no pulse on either of wires 129 or 130. The current passed by tube 180 is proportional in magnitude to the amplitude of excerpt R of dot D–1. This current first passes storage condenser 180B where the pulse is somewhat broadened (for reasons to appear later) and then passes to delay line 183 where it is delayed by two-thirds of one frame. It then passes to the control grid of tube 180A. In the absence of the commutator arrangement 163 (or equivalent) the red excerpt R of dot D–1 would therefore appear at about the position of dot F–1 two thirds the way down the face of the tube. However, as can be seen from Figure 5 when the output of generator 140 has decreased to line F of Figure 5, the output of generator 142 will position the cathode ray beam on line D. Therefore, the voltage of generator 140 has advanced to point P of Figure 6 when the signal representing excerpt R of dot D–1 emerges from delay line 183. Since the signal is somewhat broadened due to condenser 180B, it will remain on the control grid of tube 180A for a substantial time during which a pulse will be fed on wire 130 to the second grid of tube 180A causing the latter to pass a current representative of excerpt R of dot D–1. Since the synchronous motor M is synchronized with the pulses on line 130, the commutator will connect generator 142 to the vertical plates 173V synchronously with the passage of current by tube 180A. This is all occurring at time P on the output curve of generator 140 but since generator 142 is connected to the plates 173V at this moment, it should be noted that when the potential of generator 140 is at P then the potential of generator 142 will position the cathode ray beam on line D (see Figure 5). Hence, the excerpt R of dot D–1 will appear at point D–1 on Figure 5 but delayed by two thirds of one frame. The purpose of the delay is that a red section of the color disc is not due to arrive at point D–1 for two-thirds of a frame because the green portion was covering the position D–1 of Figure 5 when the impulse D–1 arrived at receiver 164.

The "blue" excerpt B of dot D–1 arrives at the control grid of tube 179 at a time one-third of a dot after the arrival of the "red" excerpt R and therefore tube 179 and it alone is energized to pass current in view of the pulse on line 129 (which follows the pulse on line 128 by one-third of a dot). This "blue" excerpt B is broadened by a condenser 179B, then delayed by one-third of one frame by delay line 182, and then fed to the control grid of tube 179A. In the absence of special vertical scanning, the "blue" excerpt B would arrive at tube 179A at a time when the beam was scanning dot E–1 in line E of Figure 5, one-third the way down the screen. This would occur at point Q (see Figure 6) on the potential curve of generator 140. When the potential of generator 140 is at Q, the potential of generator 141 is of proper value to position the cathode ray beam on line D of Figure 5. The tube 179A is not energized until a pulse on line 129 is received, and due to the synchronous relation between line 129 and commutator 163, the latter will connect generator 141 to the vertical deflection plates 173V during the interval of display of excerpt B. This will position the cathode ray beam at position D–1 where it should be. It is noted that when the excerpt B of dot D–1 arrived at receiver 164, a green sector of the color wheel was in front of point D–1 and therefore it was necessary to delay the excerpt B by one-third of a frame until a time that a blue sector of the color wheel 170A was scheduled to arrive.

When the "green" excerpt G of dot D–1 arrives at the receiver 164, the green sector of the color wheel 170A is already in front of point D–1. The excerpt G is fed directly to the control grid of tube 178 at a time when a pulse exists line 130, therefore tube 178 at a time when a pulse exists line 130, therefore tube 178 conducts current and feeds the control grid of tube 178A. No delay line is necessary in regard to excerpt G since the green sector of color wheel 170A is in front of position D–1 at the time that excerpt G arrived at receiver 164. The next pulse on line 128 will occur very quickly and will cause tube 178A to become conducting whereby the green excerpt G will be fed to grid G. The generator 140 is connected to vertical deflection plates 173V due to the fact that motor M is synchronized with the currents in lines 128, 129 and 130.

Figure 5:
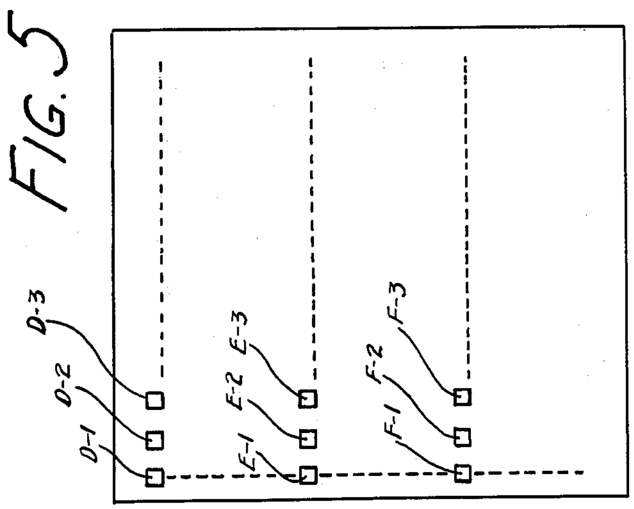
Figure 5 shows the face of the main cathode ray tube and has certain illustrative dots thereon.
Figure 6:
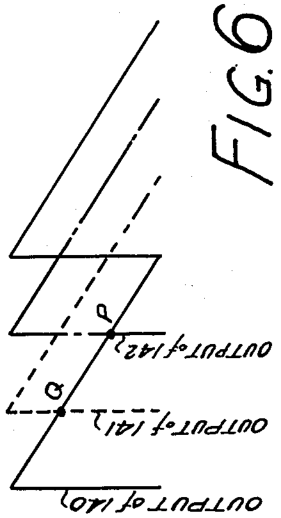
Figure 6 illustrates the waveforms of the vertical sweep generators.

The result of the foregoing operations is that the red, blue and green excerpts of dot D–1 were separated and were impressed upon position D–1 of Figure 5 at the respective different moments that the red, blue and green sectors of the color wheel passes position D–1.

Dot D–2 arrives at receiver 164 while the red and blue excerpts of dot D–1 have just started up their respective delay lines. Hence, the "green" excerpt G of dot D–2 is recorded at a time interval of one dot after the G excerpt of dot D–1, the "blue" excerpt of dot D–2 will be recorded one-third of one frame after the green excerpt, and the "red" excerpt will be recorded two-thirds of a frame after the green excerpt.

The mode of operation may also be viewed in the following way. As the green color band passes down across the screen, the "green" excerpts G of each dot are impressed on the screen. This green color band is followed by the blue color band and as the latter passes the screen excerpts "B" of each dot which were received one third of one frame earlier and have been delayed by that time are now impressed on the screen at their proper places. When the "blue" excerpts B are being impressed on the screen the commutator 163 has connected sweep generator 141 to the vertical plates 173V to restore the "blue" excerpts B to their proper position (which would otherwise have been altered due to the delay line). As the red sector of the color wheel 170A arrives in front of the screen the "red" excerpts R are impressed on the screen. While they arrived at receiver 164 two-thirds of one frame earlier, they have been delayed by that amount. In the absence of shift to sweep generator 142, the delay would have erroneously positioned the "red" information but due to the synchronous relation between commutator 163 and the currents in wires 128, 129 and 130, the "red" excerpts appear in proper position on the screen.

The information arriving at receiver 164 always represents information the correct position of which always appears on the screen at the position covered at that time by the green sector of the color wheel 170A. The blue section of the color wheel 170A always follows one-third of a frame behind the correct position of the information being received on the receiver 164, and the red section of the color wheel 170A always follows by two-thirds of a frame, the correct position on the screen of the information being received.

It is obvious that the above receiver will also receive "black and white" television transmissions of the type currently in general use, the only change required is to merely omit color wheel 170A. In such an event the "black and white" reception is better than that of present day receivers and is as follows. Each dot of "black and white" information is of constant potential, hence the variations in amplitude of parts of dots is absent. However, the dots are broken up into three excerpts by tubes 178, 179 and 180 and these excerpts are impressed upon the same spot of the screen but at intervals of one-third of a frame apart. Therefore, the entire waveform of each dot of the "black and white" video signal is impressed upon its proper spot of the screen. However, since part of the dots are delayed the picture is improved.

Those skilled in the art of color television can usually readily determine, after a review of a new receiver process, how to make a transmitter to work with the new receiver. In general it involves reversing the receiving process. Hence, I will not render this disclosure prolox by describing a transmitter to go with my color television receiver.

It is understood that by suitable modification in conventional manner, interlaced scanning may be employed.

Various forms of delay lines are well known which can be employed to constitute parts 182 and 183, but most of those having the desired high degree of accuracy are rather expensive. One of the less expensive forms of delay lines which may be used is the well known form of ultrasonic mechanical transmission in a wire of quartz. Other and more expensive forms of delay lines can produce better results. While a high degree of accuracy is desired, it is noted that a certain amount of error in the delay line can be tolerated as it merely tends to shift part of the blue or red excerpts horizontally, which may or may not be serious depending on the amount of the error and the particular picture involved.

The quartz wire may have a diameter of 1 mm. If the speed of the ultrasonic sound in the wire is 1000 meters per second the length of wire would be about 5.5 meters. The wire can be wound in a spiral on a form 8 cm. in diameter. The production of the mechanical waves at the start of the wire is by a piezo-electric crystal and the reception at the other end of the wire is also by such a crystal.

It is understood that it is unnecessary to send the G, B and R excerpts as parts of the same dot. Any well known way of sending three signals may be employed, for example these excerpts may be sent on different carriers, or they may be represented on the same carrier by different types of modulations (for example amplitude, frequency, phase, pulse, etc.).

The motor 170 may have an adjustable phase shifter associated with it so that the motor can be properly synchronized to have the green sector in front of the spots where information currently being received is impressed.

It is of course understood that instead of the delay line, the signal may be recorded on a recording disc that is synchronized with the color wheel 170A, and may be re-read from the recording disc one-third (or two-thirds as the case may be) of a frame later.

I claim to have invented:

1. In a television system, a cathode ray tube having a grid and including deflection means which may be energized to displace the beam in a first direction, scanning means for moving the beam perpendicular to the first direction in a series of lines, first and second sweep generators synchronized to operate at the same frequency but displaced in phase from each other, switching means for alternately connecting the first and second sweep generators to said deflection means, a video receiver, circuit means for applying the output of the receiver to said grid including delay means for delaying excerpts of the signals, said circuit means including switching means operable to switch the delay means out of circuit with said grid, and means for controlling both the switching means and the circuit means to switch the second sweep generator in circuit with the deflection means simultaneously with the switching of a delayed signal to said grid.

2. The system of claim 1 in which the time phase between said sweep generators is equal to the delay period of said delay means.

3. In a television system, a cathode ray tube having scanning means for controlling the position of the ray, said tube having a grid, means for applying the received signals to the grid including three circuits which sequentially carry the current to the grid, the second of said circuits including delay means for delaying the application of the signals by approximately one-third of a frame, the third of said circuits including delay means for delaying the application of the signals by approximately two-thirds of a frame, said scanning means including three sweep generators displaced in phase 120 degrees apart, and means for controlling the flow of currents in said circuits and selecting the sweep generator that controls the scanning to simultaneously connect the first circuit to the grid and to apply the voltage of the first sweep generator to the tube and then to simultaneously connect the second circuit to the grid and to apply the voltage of the second sweep generator to the tube, and then to simultaneously connect the second circuit to the grid and to apply the voltage of the second sweep generator to the tube, and then to simultaneously connect the third circuit to the grid and to apply the third sweep generator to the tube.

4. In a television receiver for receiving a series of video impulses made up of numerous dots that form a large number of parallel lines, a cathode ray tube having a grid and also having scanning means for scanning line by line, receiving means for receiving the video impulses and applying them to said grid, including first delay means for delaying certain predetermined excerpts of each dot by two-thirds of a frame, including second delay means for delaying certain other predetermined excerpts of each dot by one-third of a frame, and including third means for passing the remaining excerpt of the dot to the grid without delay, said scanning means including three sweep generators of the same frequency and displaced in phase by 120 degrees from each other, and means to switch the three sweep generators in circuit in sequence and to switch the said first, second and third means in circuit in sequence and in synchronism with the switching of the sweep generator and in proper order to produce the picture.

5. In the television system of claim 4, means synchronized with the frame frequency to apply three primary colors to bands of the face of the tube and to move said color bands across the tube face at frame frequency.

6. In a color television system, means for receiving the video signals made up of a series of dots that form a series of lines, means for separating each dot into three excerpts, a cathode ray tube having a grid and also having scanning means, means for imparting three different color bands to three different portions of the tube face and for moving said bands at frame frequency, means for applying one of said excerpts to said grid instantly upon reception to thus produce one component of color, means for delaying the second excerpt by one third of a frame and for modifying the scanning to reposition the second excerpt to substantially the same position on the screen as the first excerpt whereby the second excerpt will not appear until the second color band passes over the position where said second excerpt is displayed, and means for delaying the third excerpt by two-thirds of a frame and for modifying the scanning to reposition the third excerpt to substantially the same position on the screen as the first excerpt whereby the third excerpt will not appear until the third color band passes over the position where said third excerpt is displayed.

7. In a television system of the type employing a cathode ray tube having a target area whereupon an image is developed, a color filter having a plurality of different component color sections, said color filter being positioned so that at least one each of said different color sections are adjacent said target area at any one time, a deflection system arranged in cooperative relation with said cathode ray tube for causing the developed ray to traverse the target area along different lines respectively adjacent different color sections simultaneously with the beam successively appearing on these different lines at a high rate compared to the line frequency rate, said deflection system including means to cause the beam to scan a new series of different lines in like manner to the scanning of the lines of the first series and respectively adjacent the lines of the first series and then still another new series in like manner to the scanning of the lines of the first series and respectively adjacent the second and so on until the whole target area has been scanned, and means for displacing the color filter across said target area in the same direction and at a rate equal to the displacement on said target area of the advancement from one series of lines to the next.

8. In a color television system including means for producing a video signal in which signals representative of *n* primary color components of each spot of the picture are spaced 1/*n*th of a frame apart, a cathode ray tube having a grid controlled by the output of said means, means for sweeping the beam of said tube horizontally, vertical sweep generating means which produces a potential that changes in steps of value slightly greater than 1/*n*th of its total change at a rate which is high compared to the horizontal sweep rate with the potential which is in excess of 1/*n*th of said total change being so slight that the beam scans a large number of horizontal lines during each frame, and means for imparting *n* color bands to the face of the tube one above the next and effectively moving each of these color bands vertically at frame frequency; wherein *n* is equal to at least three and is relatively small as compared to the number of lines of the picture.

9. A television system as defined by claim 7 in which the color filter has three different component color sections, and means for breaking the received television signals for each spot on the tube face into three separate signals, one for each of said colors, and for controlling the cathode ray tube with these three signals at the three different times that the three colors are respectively filtering the light from the spot.

10. A television system as defined by claim 9 in which the last-named means includes delay means for delaying two of the said three separate signals by different time intervals so that they appear after the first of the signals by time intervals respectively equal to the times required for the color filter to change to the colors which those signals represent.

11. A television system as defined in claim 10 in which said deflection system includes all of the following: generating means which emits three saw tooth waves of the same magnitude and frequency but displaced in phase from each other, and means controlled by the received signals for successively applying the three waves to the cathode ray tube to thereby control the deflection of the beam.

12. A television system as defined in claim 7 in which said deflection system includes all of the following: generating means which emits three saw tooth waves of the same magnitude and frequency but displaced in phase from each other, and means controlled by the received signals for successively applying the three waves to the cathode ray tube to thereby control the deflection of the beam.

References Cited in the file of this patent

UNITED STATES PATENTS

| | | |
|---|---|---|
| 2,378,746 | Beers | June 19, 1945 |
| 2,492,926 | Valensi | Dec. 27, 1949 |
| 2,552,364 | Siezen | May 8, 1951 |
| 2,554,693 | Bedford | May 29, 1951 |
| 2,558,489 | Kalfaian | June 26, 1951 |
| 2,657,257 | Lesti | Oct. 27, 1953 |